United States Patent Office 3,110,688
Patented Nov. 12, 1963

3,110,688
CYCLOALIPHATIC SPIROOXETANES AND POLYMERS THEREOF
Tod Wildy Campbell, Wilmington, Del., assignor to E. I. du Pont de Nemours and Company, Wilmington, Del., a corporation of Delaware
No Drawing. Filed Apr. 1, 1960, Ser. No. 19,151
16 Claims. (Cl. 260—2)

This invention relates to a new and useful composition of matter. More specifically it is concerned with a polymeric cycloaliphatic spirooxetane, certain cycloaliphatic spirooxetanes from which they are produced, and to shaped structures formed therefrom.

OBJECTS

It is an object of the present invention to provide a novel and useful polymeric cycloaliphatic spirooxetane.

Another object is to provide shaped structures formed from a polymeric cycloaliphatic spirooxetane.

A further object is to provide a novel cycloaliphatic spirooxetane useful for producing a polymeric cycloaliphatic spirooxetane.

These and other objects will become apparent in the course of the following specification and claims.

STATEMENT OF INVENTION

The polymeric cycloaliphatic spirooxetanes of the present invention consist essentially of repeating units of the formula:

$$[-CH_2-R-CH_2-O-]_n$$

wherein —R— is a gem-bivalent cycloaliphatic radical containing at least six carbon atoms in the concatenation of atoms which includes the spiro carbon atom, $n$ being a large number of sufficient magnitude to provide a material having an inherent viscosity of at least about 0.1 when measured in m-cresol. As is noted hereinafter, copolymeric units may be present in amounts up to about 10%. These polymers are particularly useful in the preparation of shaped structures due to their high melting points and crystalline natures. They may be prepared by processes known to the art such as by contacting the corresponding spirooxetane with phosphorous pentafluoride in an inert solvent, e.g. methyl chloride at reduced temperature, preferably below about 0° C. as taught in United States Patent No. 2,831,825 of June 23, 1959 to Campbell. Other suitable processes are taught in United States Patents 2,895,931; 2,895,924; 2,895,921; 2,895,922 and 2,722,520.

SPIROOXETANE PREPARATION

The spirooxetanes of this invention are conveniently prepared by dehydration of the corresponding gem-dimethylol derivatives of the desired cycloaliphatic compound. The dehydration may be accomplished by alkali fusion of the ditosylates (p-toluene sulfonic acid esters) of the glycols or alternatively, by treatment of the glycol wtih concentrated sulfuric acid then alkali. The precursor glycol may be prepared by condensing acrolein with a suitable diene in a typical Diels-Alder reaction, followed by selective reduction of the remaining ring unsaturation, if such is desired. The adduct (an aldehyde) is then treated with alkaline formaldehyde to yield the glycol. This sequence of reactions, employing butadiene as a representative diene is as follows:

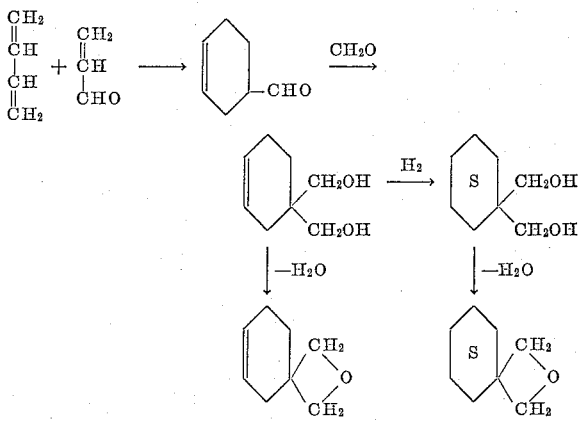

The spirooxetanes may also be prepared by reactions leading to the closure of the cycloaliphatic ring R or by formation of the oxetane ring by such reactions as the alkali treatment of halohydrins corresponding to the glycols above or by the reaction, with alkali metal alkoxides, of cyclic carbonate esters derived from such glycols by treatment with phosgene. Other synthetic techniques known in the art also may be employed.

The following examples are cited to illustrate the invention. They are not intended to limit it in any manner. The melting points of the polymeric products are crystalline melting points, determined on films on a Kofler hot stage microscope, the sample being viewed between optically crossed polarizers.

Example 1

1600 grams of butadiene is heated in an autoclave for one hour at 100° C. in a one-gallon autoclave with 1064 grams of acrolein. The product is tetrahydrobenzaldehyde of the formula:

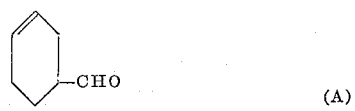

(A)

which boils at 65° C. under 20 mm. of pressure. The aldehyde is thereafter converted to the corresponding gem-dimethylol derivative by treatment with alkaline formaldehyde wherein 30 grams of potassium hydroxide in 2400 ml. of absolute alcohol is slowly added from a dropping funnel into a cooled 5-liter, 3-necked flask equipped with a stirrer and condenser and containing 440 grams (4 moles) of the aldehyde in 1000 grams of an aqueous solution containing 37% by weight of formaldehyde. Temperature of the reaction mass is maintained below 60° C. Upon completing the addition, the resulting mixture is stirred for an additional 3 hours, following which the ethanol is removed by distillation. On cooling the reaction mixture, the glycol crystallizes, is isolated by filtration and is then recrystallized from benzene using 200 ml. solvent per 100 grams of glycol. The glycol product has a melting point of 94.5–95° C. It is obtained in a 92% yield based on the unsaturated aldehyde.

Preparatory to oxetane formation, the glycol prepared as above is converted to the corresponding ditosylate by adding 400 grams of p-toluene sulfonyl chloride in 250 ml. pyridine and 250 ml. chloroform in a dropwise manner, with stirring and cooling, to 138 grams (1 mole) of the glycol in 300 ml. pyridine and 300 ml. chloroform. Upon completion of the addition, the mixture is allowed to warm and is stirred overnight. The resulting ditosylate is isolated and is used without further purification in the oxetane-forming reaction. A purified sample has a melting point of 78–79° C.

In preparing the oxetanes 1 part of ditosylate is admixed with 3 parts of an intimate sodium hydroxide-potassium hydroxide (equal weights) mixture. The mixture is heated at 300–400° C. under vacuum, the volatile materials thus formed being condensed in a Dry-Ice trap. When the evolution of such material is completed, the trap is warmed to room temperatures, whereupon 2 liquid layers form. The organic layer is separated, washed with water, dried, then purified by distillation through a spinning-band column. The pure spirooxetane has a boiling point of 74° C. under 20 mm. pressure. An analysis for carbon found 76.9% (77.36% theoretical) and for hydrogen 9.7% (9.74 theoretical). Its structure may be represented as follows:

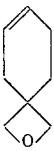
(B)

In forming polymeric spiro(1-cyclohexene-4,3′-oxetane) from (B) above, a 100 ml. 3-necked flask equipped with a stirrer, a gas-inlet tube and a Dry-Ice condenser, flushed with nitrogen to provide an inert atmosphere and cooled in a Dry-Ice bath, is charged with 5 grams spirooxetane. Approximately 50 ml. methyl chloride is condensed in the flask from a cylinder, following which the solution is stirred at gentle reflux (ca.–25° C.). A tube containing 2 grams benzenediazonium hexafluorophosphate ("Phosfluogen A," Ozark-Mahoning Company) is connected to the flask. A stream of nitrogen is passed through the tube; on heating the tube in an oil bath at 150–160° C., the liberated phosphorus pentafluoride is swept into the reaction vessel. Polymerization of the oxetane occurs rapidly, as evidenced by the separation of a white solid from the reaction mixture. The solid is isolated after deactivation of the catalyst with methanol by evaporating the solvent. The polyether is washed and dried. The yield is essentially quantitative. The polymer is pressed into a film. It has a crystalline melting point of 102° C., is soluble in benzene in which it has an inherent viscosity of 0.63 and analyses 77.2% carbon (theoretical 77.36) and 9.91% hydrogen (theoretrical 9.74). After crystallization in boiling acetone, the stretched film from the polyether exhibits an extremely high degree of crystallinity and an unusually complex X-ray diffraction pattern. It is readily cross-linked by heating to a temperature above 200° C. with a trace of sulfur, or by heating to higher temperatures without sulfur. This behavior is general with the unsaturated polyspirooxetanes.

Polymeric spiro(cyclohexane-1,3′-oxetane) is formed by the same technique by polymerizing the oxetane having the formula

(C)

The aldehyde constituting the starting material is formed by reducing (A) to the saturated aldehyde wherein 1270 grams of (A) in 650 ml. ethanol is treated with 1000 p.s.i.g. hydrogen using 15 grams palladium-on-charcoal (5%) catalyst, the reaction being run at 25° C. The reduced aldehyde is converted, without intervening isolation, to the corresponding gem-dimethylol derivatives by treatment with alkaline formaldehyde using the technique illustrated above. The glycol, obtained in 86% yield based on the unsaturated aldehyde and formed from the saturated aldehyde following the technique described above, has a melting point of 99.0–99.5° C. The ditosylate formed from the glycol as taught previously has a melting point of 90–91° C. The spirooxetane boils at 64° C. under 14 mm. of pressure and analyses show 76.01% carbon (76.13% theoretical) and 11.11% hydrogen (11.18% theoretical). The polymeric spirooxetane has a melting point of 152° C., is soluble in tetrachloroethylene at 100° C. in which it has an inherent viscosity of 0.4. Analyses show 76.1% carbon (76.13% theoretical) and 10.7% hydrogen (11.18 theoretical). A film pressed from the polymer is stretched and found to be highly orientable.

*Example 2*

A copolymer from 1.5 grams of (B) above and 30 grams of bis(chloromethyl)oxetane (using 250 ml. of boiling methyl chloride, B.P. –25° C., as solvent) is prepared using the equipment of Example 1. The solid white polymer product is filtered, washed with alcohol and dried. The polymer melts at about 160° C. and is highly crystalline and orientable. It is crosslinked by heating. Other common crosslinking agents such as peroxides, sulfur, dimercaptans, etc., or U.V. irradiation may be used. It is thus apparent that polyoxetanes containing minor amounts, i.e. from about 1% to about 20% of repeating units of an unsaturated spirooxetane have enhanced utility.

Other aldehydes useful in preparing the spirooxetanes and the polymeric products thereof of the present invention are shown in Table I.

TABLE I

| Aldehydes | Spirooxetanes |
| --- | --- |
| (D) ![structure with CH3 and CHO on benzene ring] | (G) and (H) |
| (E) ![bicyclic structure with CHO] | (I) and (J) |
| (F) ![bicyclic structure with CHO] | (K) and (L) |

Table II below outlines the reactants and reaction conditions employed in forming aldehydes (D), (E) and (F) as well as the boiling points of these products.

TABLE II

| Aldehyde | Reactants | Conditions | Boiling Point (°C./mm.) |
| --- | --- | --- | --- |
| (D) | 1,300 gm. isoprene, 1,000 gm. acrolein. | 4 hr. at 100° C. (autoclave). | 79–81/30 |
| (E) | Excess cyclopentadiene (distilled from dimer) 350 gm. acrolein. | Exothermic. | 78/25 |
| (F) | 50 gm. cyclohexadiene, 70 gm. acrolein. | 4 hr. at 100° C. (autoclave). | 95/21 |

Melting points and yields of the intermediate glycols and the melting points of their ditosylates formed from the aldehydes shown in Tables I and II, using the technique of Example I, are reported in Table III below.

TABLE III

| Spirooxetane Formed | Glycol[1] | | Glycol Ditosylate, Melting Point (° C.) |
|---|---|---|---|
| | M.P. (° C.) | Yield (percent) | |
| G | 113–113.5 | 41 | 99–100 |
| H | 86–96 | 41 | 72.5–74 |
| I | 114.5–115 | 76 | 129–129.5 |
| J | 98.0–99.0 | 69 | 107–108 |
| L | 131.0 | 66 | 114.5–116 |

[1] Based on unsaturated aldehyde except (L) which is based on cyclohexadiene.

The boiling points of the spirooxetanes identified in Table I and formed from the intermediates of Table III are reported below in Table IV together with properties of the polymeric spirooxetanes. The procedure of Example I is employed in each of these preparations.

TABLE IV

| Spirooxetane | | Polymeric Spirooxetane | |
|---|---|---|---|
| Identity | B.P. (° C./mm.) | M.P. (° C.) | Remarks |
| G | 74–75/11 | 155–156 | Intermediate crystallinity. |
| H | 120–121/81 | 159–164 | Soluble in benzene; Highly crystalline. |
| I | 81/20 | 190 | |
| J | 90–91/24 | 208 | Highly crystalline, Sl.Sol. in hot xylene chlorobenzene. |
| L | 117/24 | 290 | Highly crystalline; Insoluble. |

Table V presents carbon, hydrogen determination results the figures in parentheses indicating the theoretical values.

TABLE V

| Identity | Spirooxetane | | Polymeric Spirooxetane | |
|---|---|---|---|---|
| | Carbon | Hydrogen | Carbon | Hydrogen |
| G | 78.01 (78.3) | 10.00 (10.12) | | |
| H | 77.3 (77.2) | 11.02 (11.43) | 77.3 (77.2) | 11.0 (11.43) |
| I | 79.12 (79.37) | 8.89 (8.94) | 79.6 (79.37) | 9.1 (8.89) |
| J | 78.07 (78.22) | 10.01 (10.21) | 78.0 (78.22) | 10.49 (10.21) |
| L | 78.8 (78.91) | 10.07 (10.59) | 78.3 (78.91) | 11.0 (10.59) |

Table VI identifies by chemical name the spirooextanes whose properties are listed above.

TABLE VI

| Identity | Name |
|---|---|
| G | spiro[1-methyl-1-cyclohexene-4,3′-oxetane]. |
| H | spiro[1-methylcyclohexane-4,3′-oxetane]. |
| I | spiro[norbornene-5,3′-oxetane]. |
| J | spiro[norbornane-2,3′-oxetane]. |
| L | spiro[bicyclo(2·2·2)octane-2,3′-oxetane]. |

While the invention has been illustrated by the preparation and polymerization of hydrocarbon cycloaliphatic spirooxetanes, it is apparent that related substituted derivatives can be similarly prepared. For example, substituted aliphatic dienes may be employed in the synthetic scheme utilized hereinabove to yield ultimately spirooxetanes and polyethers bearing such substituent groups. Similarly, the use of other substituted dienes, e.g. chloroprene, 2-phenyl butadiene, 2,3-diphenyl butadiene, and fluorinated butadienes would yield the correspondingly substituted cycloaliphatic spirooxetane. Substituted spirooxetanes also are formed via addition reactions taking place at centers of unsaturation in cycloaliphatic dienes as illustrated above with cyclo pentadiene and cyclo hexadiene. By employing aldehydes rather than formaldehyde in the glycol-forming reaction with the various Diels-Alder adducts (v.s.), spirooxetanes having alkyl substitution, particularly lower alkyl substitution, in the oxetane ring can be formed. In general, any cycloaliphatic gem-dimethylol derivative can be converted to the spirooxetanes and polyethers of this invention, including such compounds containing fused aromatic rings, e.g., fluorene-9,9-dimethanol. Other spirooxetanes and derived polyethers which fall within the purview of this invention include those wherein the cycloaliphatic group R is 7,7-norbornylidene, isonorbornylidene, tetralinylidene, decalinylidene, indenylidene and the like gem-bivalent radicals. The hydrocarbon cycloaliphatic spirooxetanes containing from about 6 to about 20 carbon atoms in the cycloaliphatic radical are preferred. Since the molecular weight of the polymer appears to depend to a certain extent on monomer purity, these materials should be purified prior to polymerization. The spirooxetanes, as is characteristic of most cyclic ethers, are prone to autooxidation, hence should be protected from atmospheric oxygen. For prolonged storage, a stabilizer, e.g., p-t-butyl pyrocatechol, may be employed.

The linear polyethers and copolyethers of the present invention wherein the cycloaliphatic ring contains residual unsaturation, such as those derived from B, G, I, and K above, may be cross-linked or cured by heating with compounds such as peroxides, sulfur, dimercaptans and the like or by irradiation. All of the polymers of the present invention are both high-melting and crystalline. From a theoretical consideration it would be expected that the presence of the relatively bulky, non-polar cycloaliphatic groups along the polymer chain would greatly interfere with the ability of such chains to align and crystallize, resulting in low-melting, amorphous materials of limited utility. While applicant does not wish to be bound by any theory, it is believed that these compounds exhibit a "pseudo-tacticity," (i.e. they are analogous to the isotactic hydrocarbons presumably due to arrangement of the cycloaliphatic substituents with radial symmetry along the length of the polymer chain, the "plane" of each substitutent being disposed perpendicularly to the axis of the chain. Irrespective the structure from which the present behavior derives, all of the polymers of this invention exhibit melting points in excess of 100° C., are attenuatable to high levels of orientation, and are highly crystalline, as measured by conventional X-ray diffraction techniques. Those polymers having an inherent viscosity of at least about 0.4 in m-cresol are particularly desirable.

The comonomers which in the preferred embodiment may comprise up to about 10% of the polymer weight are cyclic ethers and cyclic thioethers which usually contain from 3 to 4 atoms in the ring. Exemplary of such compounds are ethylene oxide (oxirane), ethylene sulfide, epichlorohydrin, propylene oxide, trimethylene oxide, trimethylene sulfide, 3,3-bis(halomethyl)oxetanes, and the like. Ethylenically unsaturated materials such as isobutylene, 2-methyl styrene, vinyl ether, and the like also may be employed. Comonomers such as 2,6-dioxaspiro(3,3) heptane, 2-oxa-6-thiospiro (3,3) heptane, etc. may be used to produce cross-linked material (United States Patent No. 2,891,837). Other polymers comprising minor amounts of structural units derived from the unsaturated spirooxetanes also are cross-linkable.

The polymers provided in accordance with the present invention are useful in the preparation of shaped articles such as films, fibers and the like, which articles can be prepared by moulding, casting, spinning and the like, including plasticized melt extrusion techniques, as taught by Rothrock in United States Patent No. 2,706,674. The polymers may be applied as coatings on other articles, such as wire. The utility of such articles or coatings is enhanced by the inherent stability and inertness of the instant polyethers. These structures may obviously contain conventional amounts of such additives as pigments, fillers, plasticizers, viscosity modifying agents, antioxidants and the like, such materials being added to afford improved processability and/or to enhance the appearance of the final product. Other art-recognized compositional modifications also may be practiced, as long as such modifications do not detract from the overall utility of the instant polymers.

Many equivalent modifications will be apparent to those skilled in the art from a reading of the above without a departure from the inventive concept.

What is claimed is:

1. A polymer consisting essentially of repeating units of the structure

—CH₂—R—CH₂—O— wherein —R— is selected from the group consisting of saturated and monounsaturated gem-bivalent cycloaliphatic radical containing at least six carbon atoms, said polymer having an inherent viscosity of at least about 0.1 when measured in m-cresol.

2. The polyoxetane of claim 16 cured by treatment with a cross-linking agent.

3. A polymer consisting essentially of the following repeating unit

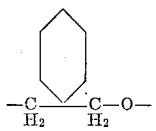

said polymer having an inherent viscosity of at least about 0.1 when measured in m-cresol.

4. A polymer consisting essentially of the following repeating unit

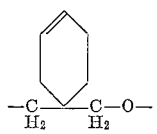

said polymer having an inherent viscosity of at least about 0.1 when measured in m-cresol.

5. A polymer consisting essentially of the following repeating unit

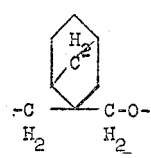

said polymer having an inherent viscosity of at least about 0.1 when measured in m-cresol.

6. A polymer consisting essentially of the following repeating unit

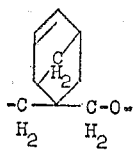

said polymer having an inherent viscosity of at least about 0.1 when measured in m-cresol.

7. A polymer consisting essentially of the following repeating unit

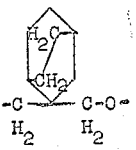

said polymer having an inherent viscosity of at least about 0.1 when measured in m-cresol.

8. A polymer consisting essentially of the following repeating unit

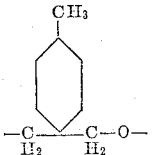

said polymer having an inherent viscosity of at least about 0.1 when measured in m-cresol.

9. A polymer consisting essentially of the following repeating unit

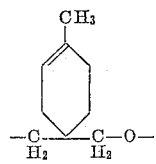

said polymer having an inherent viscosity of at least about 0.1 when measured in m-cresol.

10. A compound of the structural formula

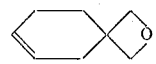

11. A compound of the structural formula

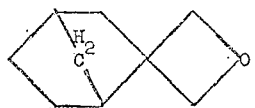

12. A compound of the structural formula

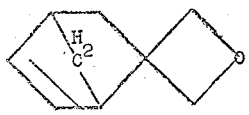

13. A compound of the structural formula

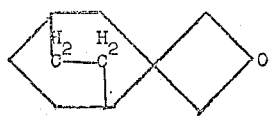

14. A compound of the structural formula

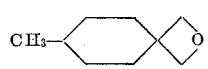

15. A compound of the structural formula

16. A polymer consisting essentially of the following repeating units:

(A)
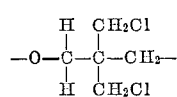

and (B)
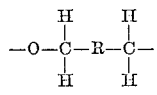

wherein the polymer contains from about 1–20% of (B) and the remainder (A) and wherein —R— is a gem bivalent nuclear monounsaturated cycloaliphatic radical containing at least six carbon atoms, said polymer having an inherent viscosity of at least about 0.1 when measured in m-cresol.

References Cited in the file of this patent

UNITED STATES PATENTS 2,722,492    Ralston _____ Nov. 1, 1955

OTHER REFERENCES

Patterson et al.: "The Ring Index," page 99, Reinhold Pub. Corp., N.Y., 1940.

Grant: "Hackh's Chemical Dictionary," 3rd edition, McGraw-Hill, page 798.